United States Patent
Chang

[11] Patent Number: 5,970,617
[45] Date of Patent: Oct. 26, 1999

[54] STEPPED TREE PRUNER

[76] Inventor: Jung-Hsien Chang, 7F-2, No. 5, Fu An St., Fu An Li, Shi-Tun Chu, Taichung, Taiwan

[21] Appl. No.: 09/175,840

[22] Filed: Oct. 19, 1998

[51] Int. Cl.$^6$ ..................................................... B26B 13/06
[52] U.S. Cl. ............................................... 30/249; 30/250
[58] Field of Search ............................. 30/249, 250, 188, 30/231, 189, 190

[56] References Cited

U.S. PATENT DOCUMENTS

| | | | |
|---|---|---|---|
| 5,511,314 | 4/1996 | Huang | 30/249 X |
| 5,634,276 | 6/1997 | Lin | 30/249 |
| 5,743,012 | 4/1998 | Wang | 30/249 |

Primary Examiner—Douglas D. Watts
Attorney, Agent, or Firm—W. Wayne Liauh

[57] ABSTRACT

A tree pruner is composed of a fastening piece, a cutting piece, and two swivel pieces. The fastening piece is provided with a connection portion which is in turn provided with a pulley and is fastened with a bracing rod. The fastening piece is provide at one end thereof with a blade. The cutting piece is fastened pivotally with the fastening piece and provided with a toothed slot and a tool portion capable of cooperating with the blade of the fastening piece. The two swivel pieces are fastened pivotally with the fastening piece and provided with a control element which is put through the toothed slot and is linked with a spring. The cord such that the cutting piece is actuated to execute the severing of a tree twig in conjunction with the blade of the fastening piece.

5 Claims, 9 Drawing Sheets

Fig·1
PRIOR ART

STEPPED TREE PRUNER

FIELD OF THE INVENTION

The present invention relates generally to a pruner, and more particularly to a stepped tree pruner capable of pruning a tree with ease and speed.

BACKGROUND OF THE INVENTION

The conventional tree pruner is intended to remove dead or living parts from a tree so as to increase fruit or flower production or improve the tree form. As shown in FIG. 1, a tree pruner of the prior art is provided at the top end thereof with a bracing rod 1 having a fitting body 11 which is in turn provided with a fastening piece 12. The fastening piece 12 is provided at one end thereof with an arcuate portion 121 and is fastened pivotally at other end thereof with a pull rod 13. Located between the pull rod 13 and the fastening piece 12 is a tension spring 14. The fastening piece 12 is fastened pivotally with a cutting piece 15 which is fastened pivotally at other end thereof with the pull rod 13. The pull rod 13 and the fitting body 11 are provided respectively with a pulley 16, 17. A pull cord 18 runs through the pulleys 16, 17. As the pull cord 18 is pulled, the pull rod 13 and the cutting piece 15 are actuated.

In operation, the arcuate portion 121 of the fastening piece 12 and the cutting piece 15 are supported on a tree twig before the pull cord 18 is pulled to actuate the pull rod 13 to swivel so as to actuate the cutting piece 15 such that the tree twig is severed by the cutting piece 15 in conjunction with the arcuate portion 121. As the pull cord 18 is let go, the pull rod 13 and the cutting piece 15 are forced by the elastic force of the tension spring 14 to return to their original positions. The tree pruner is once again ready to work.

Such a tree pruner of the prior art as described above is defective in design in that the cutting piece 15 and the arcuate portion 121 are not able to sever a rough tree twig in one step, and that the user of the tree pruner must pull the pull cord 18 with a greater effort to actuate the cutting piece 15 and the arcuate portion 121. In other words, the tree pruner of the prior art does not work efficiently.

SUMMARY OF THE INVENTION

The primary objective of the present invention is to provide an improved tree pruner free from the shortcoming of the prior art tree prior art tree pruner described above.

In keeping with the principle of the present invention, the foregoing objective of the present invention is attained by a tree pruner consisting of a fastening piece, a cutting piece, and two swivel pieces. The fastening piece is provided at the lower end thereof with a connection portion having a pulley. A bracing rod is fastened with the connection portion. The fastening piece is provided at other end thereof with a blade. The cutting piece is pivotally fastened with the fastening piece and provided at one end thereof with a toothed slot. The cutting piece is further provided with a tool portion capable of cooperating with the blade. The two swivel pieces are fastened pivotally with the fastening piece. A control element is located between the two swivel pieces such that the control element is put through the toothed slot, and that the control element is linked with a spring. The two swivel pieces are actuated to swivel by a pull cord such that the cutting piece is actuated to execute the cutting of a tree twig in conjunction with the blade. The cutting of the tree twig is carried out in one or more steps with a minimum of effort.

The foregoing objective, features, functions, and advantages of the present invention will be more readily understood upon a thoughtful deliberation of the following detailed description of a preferred embodiment of the present invention with reference to the accompanying drawings.

DETAILED DESCRIPTION OF THE EMBODIMENT

Figure 1:
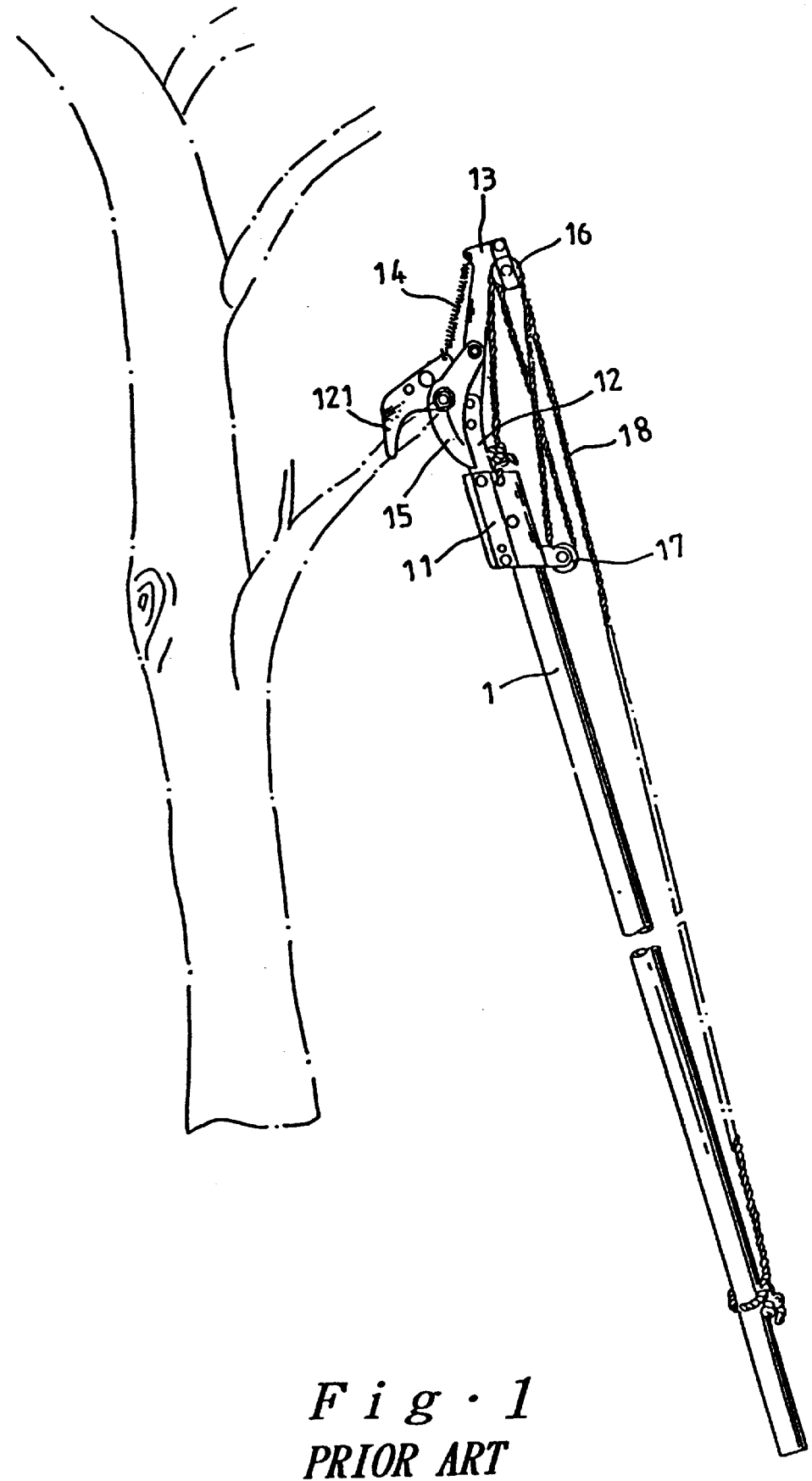
FIG. 1 shows a schematic view of a tree pruner of the prior art.
Figure 2:
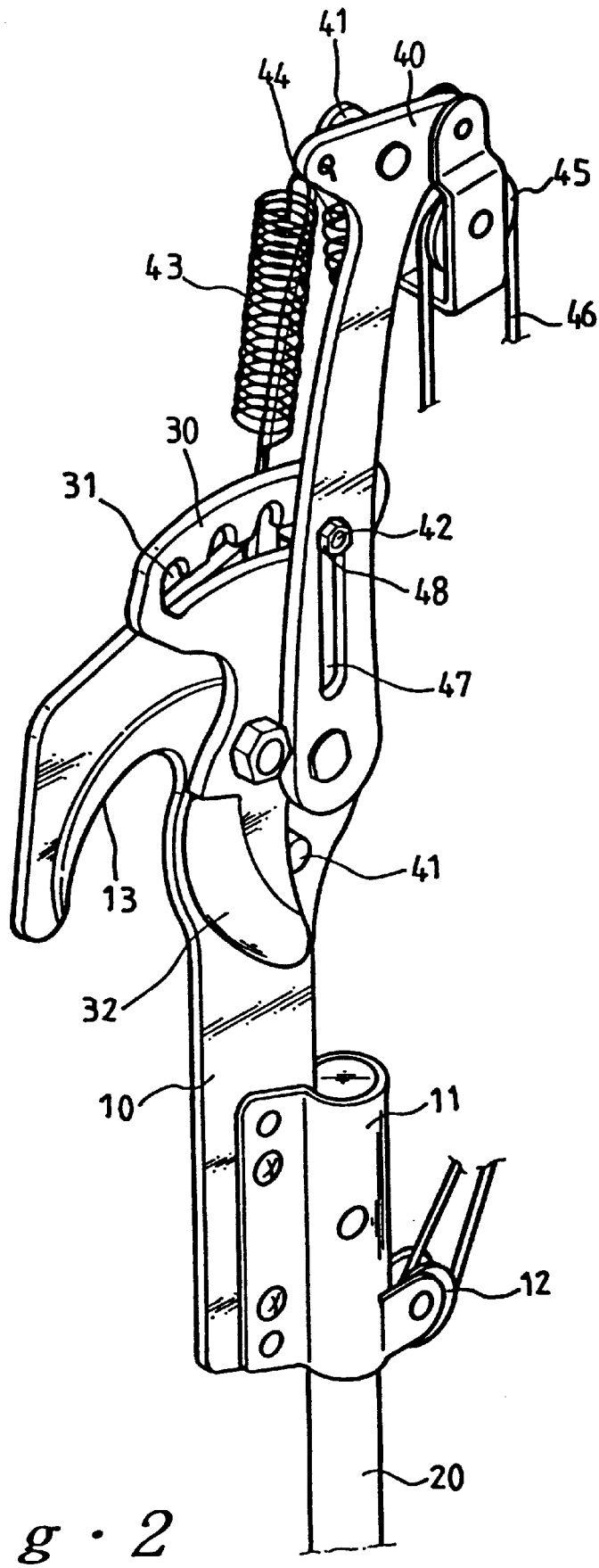
FIG. 2 shows a schematic view of a tree pruner of the present invention.
Figure 3:
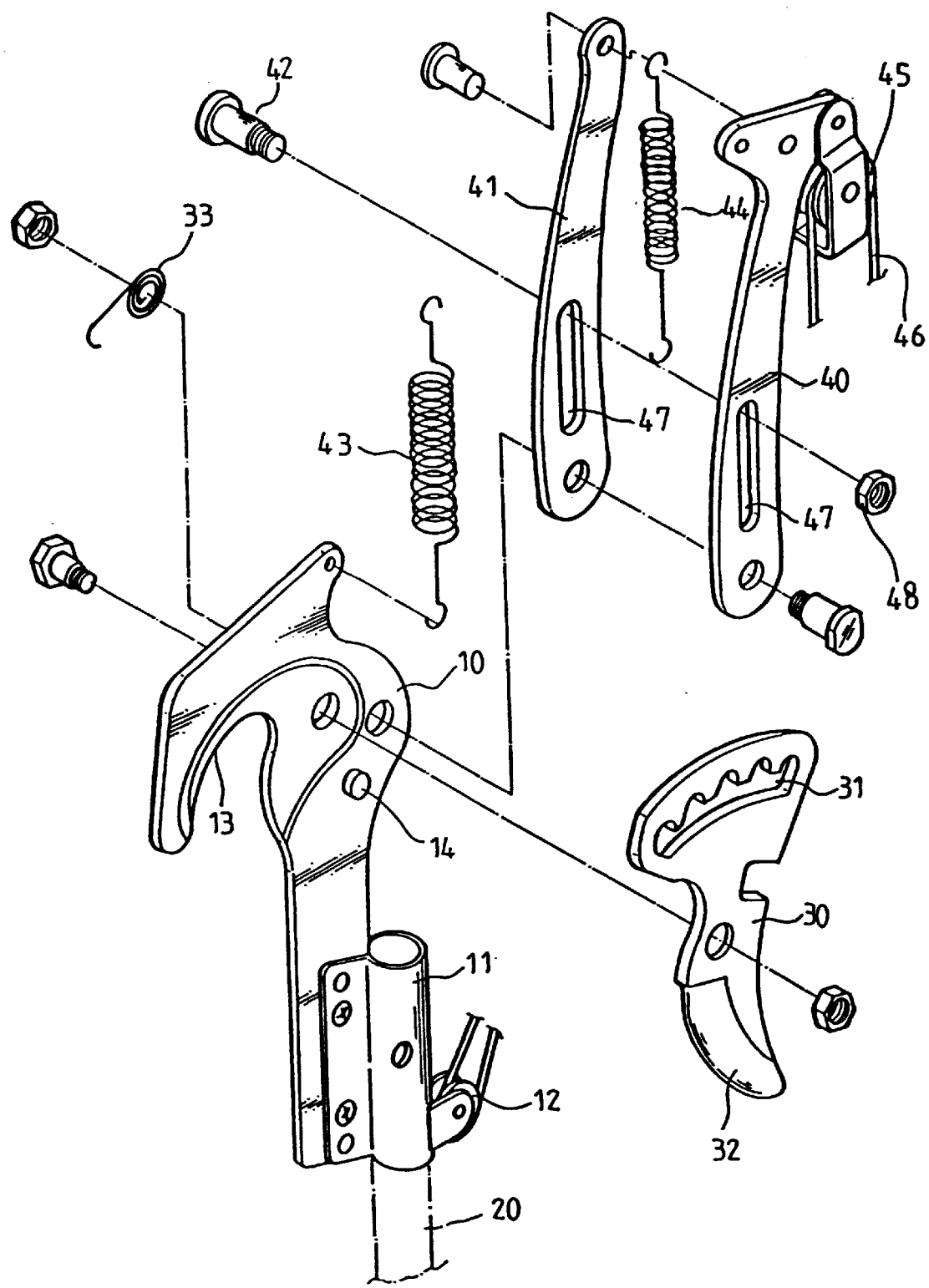
FIG. 3 shows an exploded view of the tree pruner of the present invention.

As shown in FIGS. 2 and 3, a tree pruner embodied in the present invention is composed of a fastening piece 10, a cutting piece 30, and two swivel pieces 40.

The fastening piece 10 is provided at the lower end thereof with a connection portion 11 having a pulley 12. The connection portion 11 is fastened with a bracing rod 20. The fastening piece 10 is further provided at other end thereof with a blade 13. The fastening piece 10 is still further provided with an arresting block 14.

The cutting piece 30 is pivotally fastened with the fastening piece 10. The cutting piece 30 is provided with a toothed slot 31 and a tool portion 32 capable of cooperating with the blade 13.

The two swivel pieces 40 and 41 are fastened pivotally with the fastening piece 10 such that the two swivel pieces 40 and 41 are parallel to each other. Located between the first swivel piece 40 and the fastening piece 10 is a tension spring 43. The swivel pieces 40 and 41 are provided with a slide slot 47 for receiving a control element 42 which is put through the toothed slot 31 of the cutting piece 30. The control element 42 is a bolt, which is put through the first swivel piece 40 to engage a nut 48 located in the outer side of the second swivel piece 41. A spring 44 is located between the first swivel piece 40 and the control element 42. The first swivel piece 40 is provided at the top end thereof with a pulley 45 in which a pull cord 46 runs. The pull cord 46 also runs through the pulley 12 of the connection portion 11 of the fastening piece 10.

Figure 4:
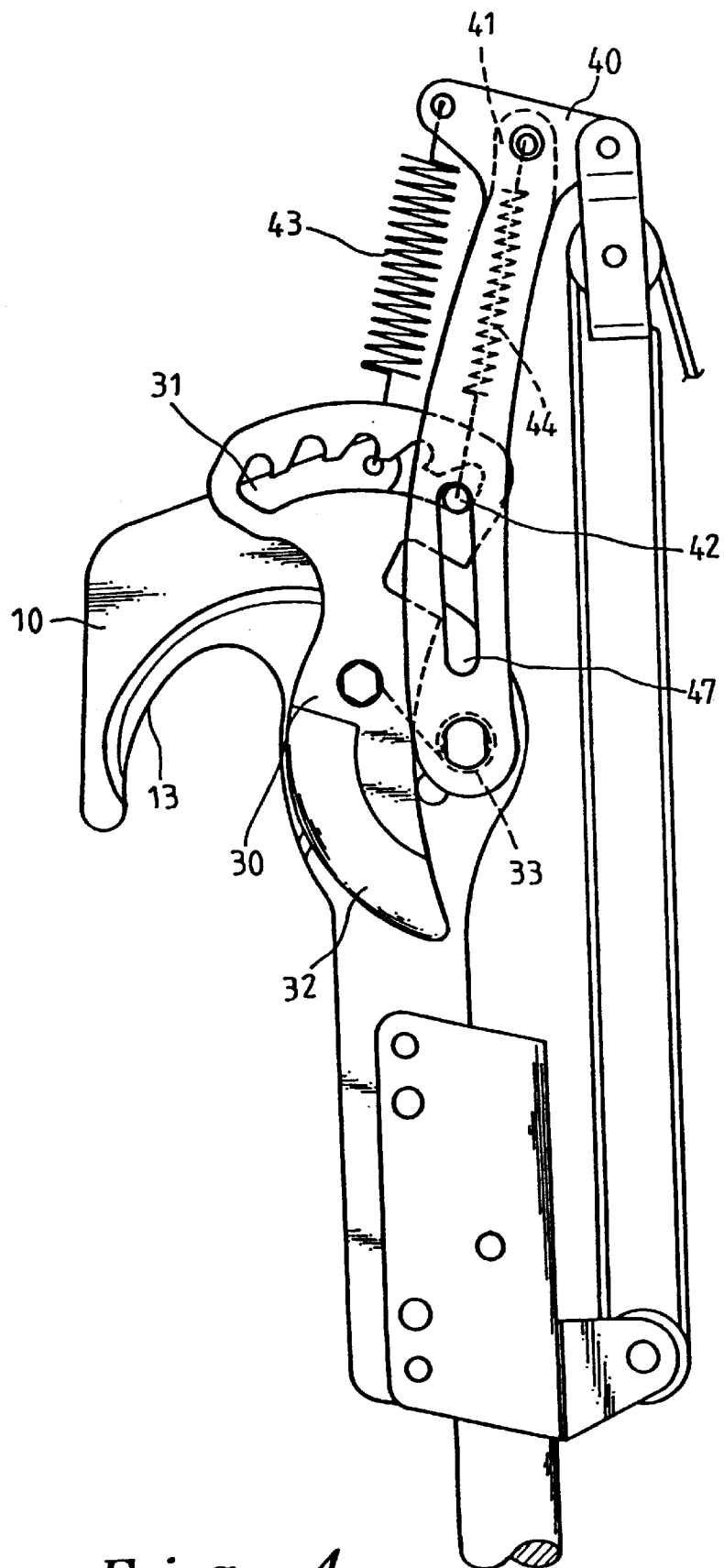
FIG. 4 shows a plan schematic view of the tree pruner of the resent invention.

As shown in FIG. 4, before the tree pruner of the present invention is at work to sever a tree twig, the cutting piece 30 is vertically located such that the tool portion 32 and the blade 13 of the fastening piece are provided therebetween with a receiving space for receiving the tree twig. In the meantime, the two swivel pieces 40 and 41 are pulled by the tension spring 43 to swivel upwards, whereas the control element 42 is pulled by the spring 44 to urge the slide slot 47 and to locate at a lower urging point 31A of the toothed slot 31 of the cutting piece 30.

Figure 5:
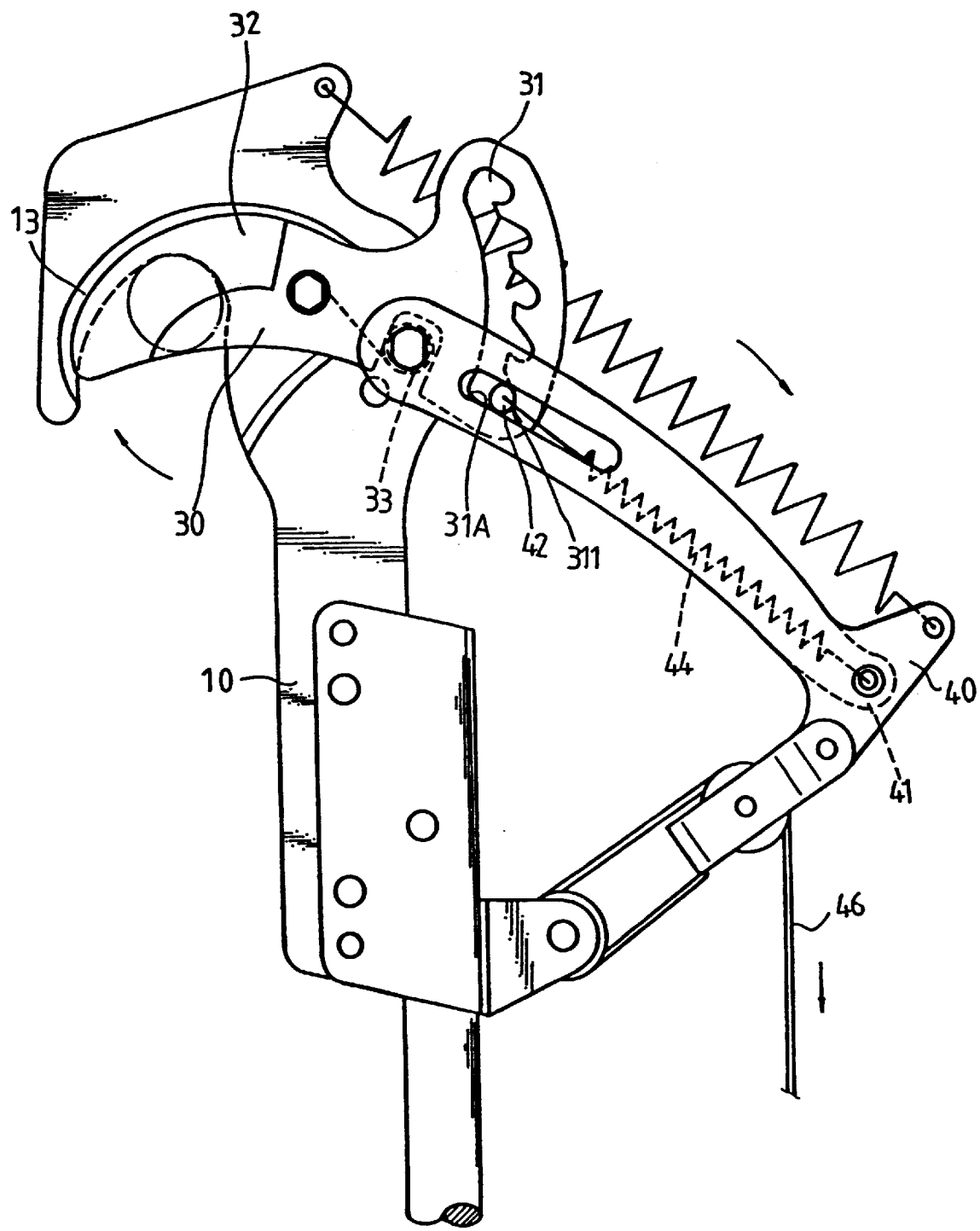
FIG. 5 shows a schematic view of the tree pruner of the present invention in action.

As shown in FIG. 5, if the tree twig is relatively small in diameter, the cutting operation can be initiated by using the cutting piece 30 and a retaining slot 311 of a greater shearing force, in conjunction with the control element 42. The pull cord 46 is pulled to actuate the two swivel pieces 40 and 41 to swivel downwards at the same time to catch the spring 44 located between the first swivel piece 40 and the control element 42. The control element 42 is actuated by the elastic force of the spring 44 to displace upwardly to move from the lower urging point 31A of the toothed slot 31 of the cutting piece 30 into the retaining slot 311. As the pull cord 46 is continuously pulled downwards, the cutting piece 30 is actuated by the control element 42 to swivel downwards to bring about a shearing force. The tool portion 32 of the cutting piece 30 swivels in reverse to cooperate with the blade 13 of the fastening piece 10 so as to sever th e tree twig.

Figure 6:
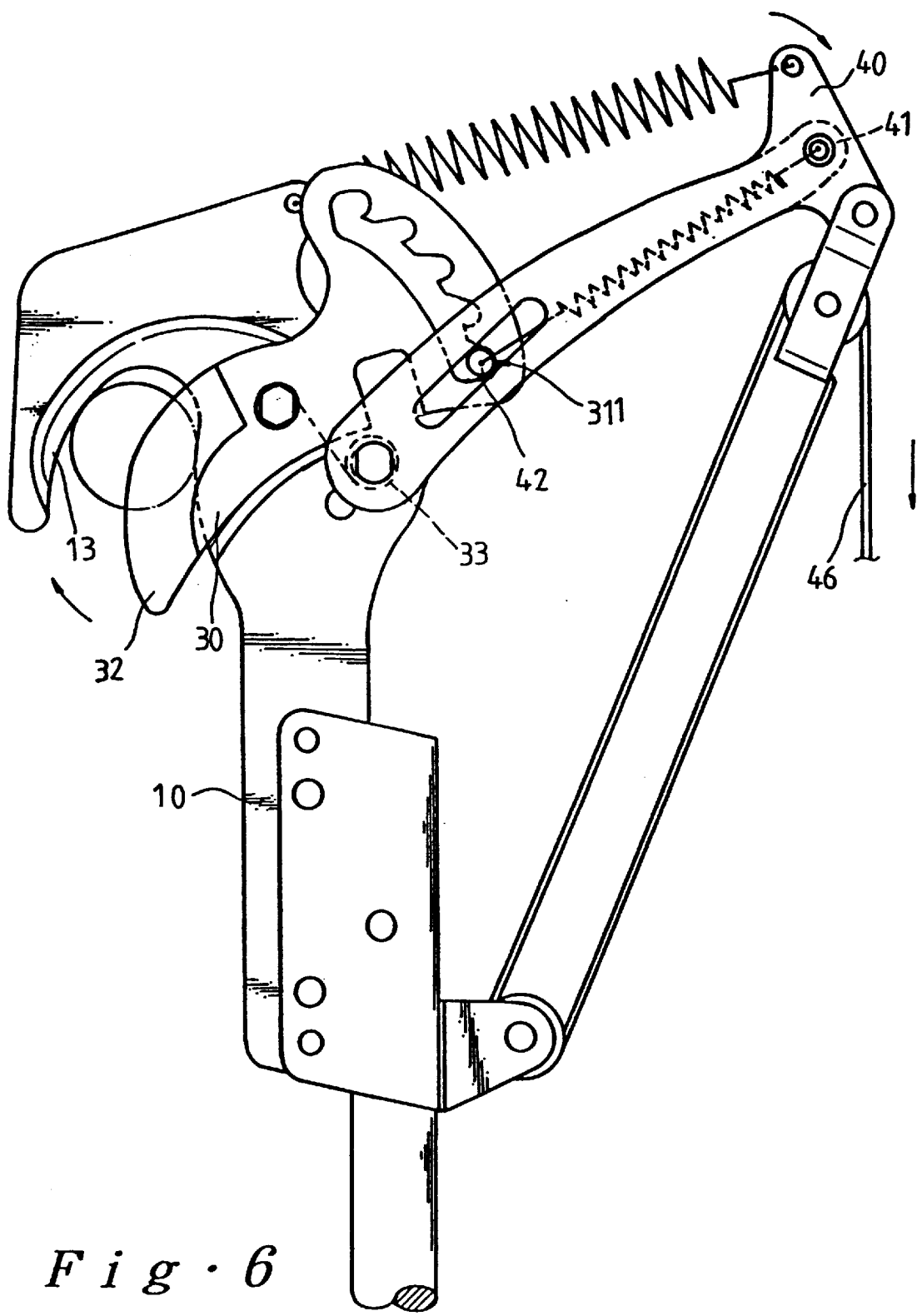
FIG. 6 shows another schematic view of the tree pruner of the present invention in action.
Figure 7:
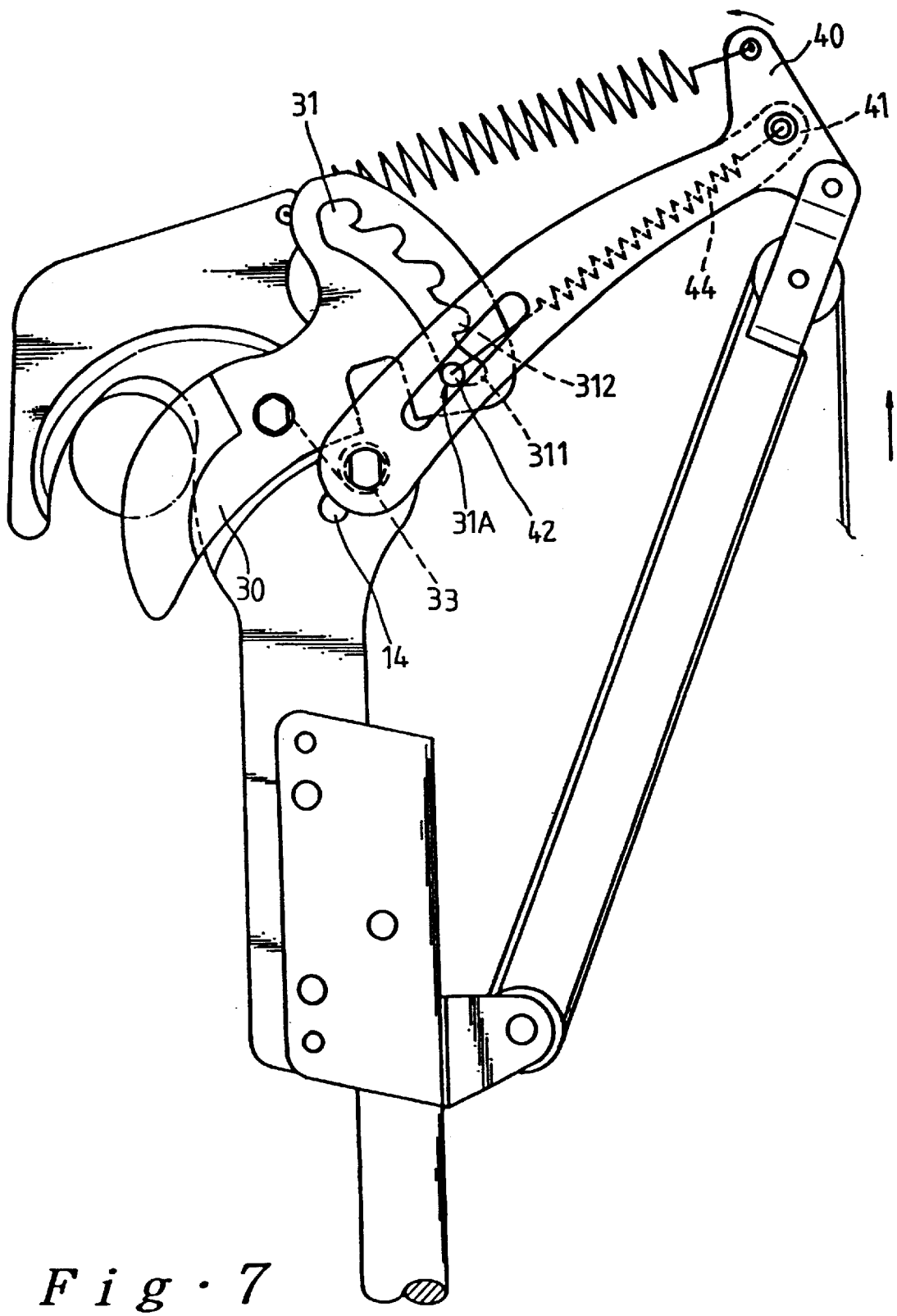
FIG. 7 is a schematic view illustrating the adjusting of the retaining slot of the present invention.
Figure 8:
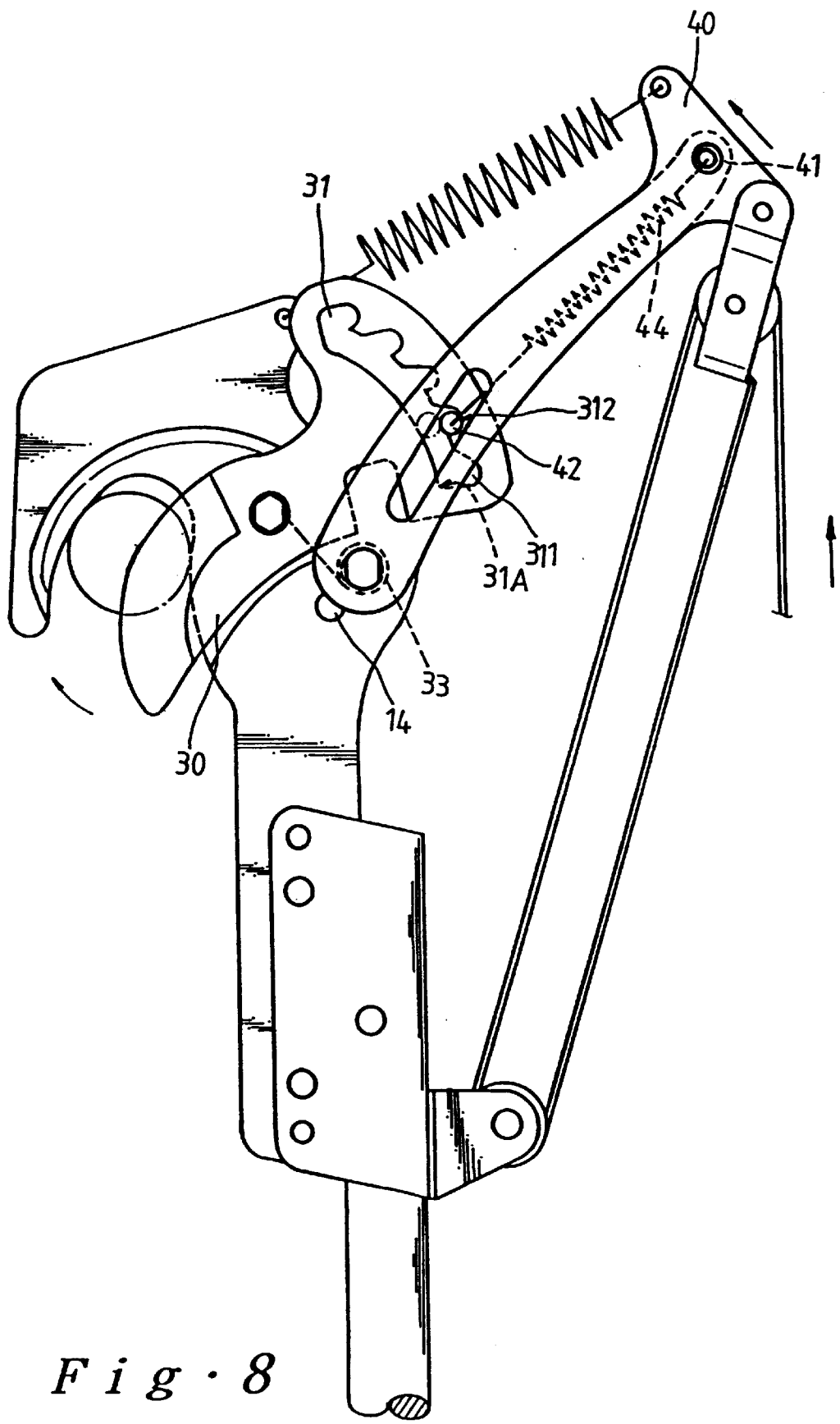
FIG. 8 is another schematic view illustrating the adjusting of the retaining slot of the present invention.
Figure 9:
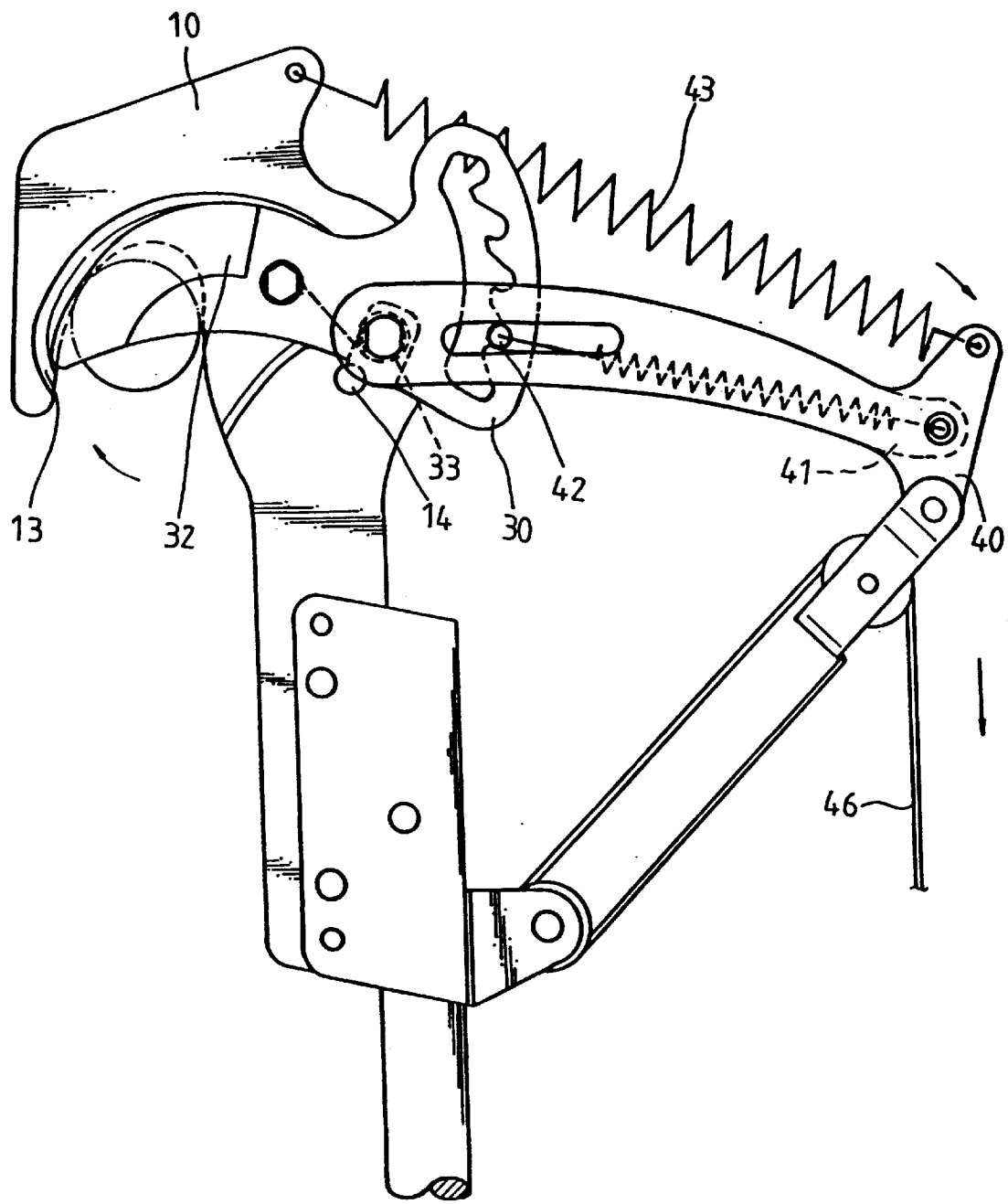
FIG. 9 shows a schematic view of the tree pruner of the present invention at work.

As shown in FIG. 6, if the tree twig is relatively tough and large in diameter, the cutting operation may be carried out in two or more steps. Under such a circumstance as described above, the pull cord 46 is pulled to actuate the two swivel pieces 40 and 41 such that the control element 42 is displaced and retained in the retaining slot 311. The pull cord 46 is continuously pulled such that the cutting piece 30 is actuated by the control element 42 to swivel, thereby causing the tool portion 32 of the cutting piece 30 to cooperate with the blade 13 of the fastening piece 10 so as to make a cut into the tree twig without severing the tree twig. Now referring to FIGS. 7 and 8, the control element 42 is so adjusted to locate in another retaining slot 312. In light of the arresting block 14, the swiveling motion of the cutting piece 30 is confined to make the severing of the tree twig relatively easy. The swivel pieces 40 and 41 are allowed to swivel upwards for a small range, thereby causing the control element 42 to move from the retaining slot 311 to the lower urging point 31A of the toothed slot 31 of the cutting piece 30. As the pulling force is continuously released, the control element 42 is forced by the pulling force of the spring 44 to move from the lower urging point 31A to the retaining slot 312. Now referring to FIG. 4 and 9, the operator of the tree pruner pulls the pulling cord 46 once again to actuate the swivel pieces 40 and 41 to swivel downwards, thereby causing the control element 42 to actuate the cutting piece 30 to swivel downwards. In light of the cutting piece 30 being confined by the arresting block 14, the cutting range of the cutting piece 30 is so shortened as to result in a reduction in the application force. In the meantime, the tool portion 32 of the cutting piece 30 cooperates with the blade 13 of the fastening piece 10 to execute the final step of the severing action of the tree pruner. As the tree twig is severed, the pull cord 46 is let go such that the swivel pieces 40 and 41 are forced by the elastic force of the tension spring 43 to return to their original positions, and that the cutting piece 30 is forced by the torsion spring 33 to return to its original position. The tree pruner is once again ready for action to sever another tree twig.

The present invention makes the tree pruning an easy chore, thanks to the control element 42 which can be retained in the retaining slots 311 and 312 so as to bring about the severing action in a plurality of steps.

The embodiment of the present invention described above is to be deemed in all respects as being merely illustrative and not restrictive. Accordingly, the present invention may be embodied in other specific forms without deviating from the spirit thereof. The present invention is therefore to be limited is only by the scopes of the following appended claims.

What is claimed is:

1. A tree pruner comprising: a fastening piece provided at one end thereof with a connection portion which is provided with a pulley and fastened with a bracing rod, said fastening piece further provided at other end thereof with a blade; a cutting piece fastened pivotally with said fastening piece and provided with a plurality of toothed slots, said cutting piece further provided with a tool portion capable of cooperating with said blade; and two swivel pieces fastened pivotally with said fastening piece and provided therebetween with a control element which is put through said toothed slots of said cutting piece, one of said two swivel pieces and said fastening piece being provided therebetween with a tension spring which is fastened at both ends thereof with said fastening piece and said one of said two swivel pieces, said control element being linked to said swivel pieces with a spring, one of said swivel pieces provided with a pulley in which a pull cord runs, said pull cord intended to actuate said swivel pieces to swivel.

2. The tree pruner as defined in claim 1, wherein said swivel pieces are provided with a slide slot for disposing said control element.

3. The tree pruner as defined in claim 1, wherein said swivel pieces and said cutting piece are pulled by a torsion spring.

4. The tree pruner as defined in claim 1, wherein said control element is a bolt which is engaged with a nut via said slide slots of said swivel pieces and said toothed slots of said cutting piece.

5. The tree pruner as defined in claim 1, wherein said fastening piece is provided an arresting block located under said cutting piece.

* * * * *